(12) United States Patent
Ishikawa et al.

(10) Patent No.: US 8,908,921 B2
(45) Date of Patent: Dec. 9, 2014

(54) OBJECT DETECTION METHOD AND OBJECT DETECTOR USING THE METHOD

(75) Inventors: Seiji Ishikawa, Kitakyushu (JP); Joo Kooi Tan, Kitakyushu (JP); Yuuki Nakashima, Kitakyushu (JP); Takashi Morie, Kitakyushu (JP)

(73) Assignee: Kyushu Institute of Technology, Kitakyushu-shi (JP)

( * ) Notice: Subject to any disclaimer, the term of this patent is extended or adjusted under 35 U.S.C. 154(b) by 58 days.

(21) Appl. No.: 13/990,005

(22) PCT Filed: Nov. 28, 2011

(86) PCT No.: PCT/JP2011/077404
§ 371 (c)(1),
(2), (4) Date: Jun. 13, 2013

(87) PCT Pub. No.: WO2012/073894
PCT Pub. Date: Jun. 7, 2012

(65) Prior Publication Data
US 2013/0251206 A1 Sep. 26, 2013

(30) Foreign Application Priority Data
Nov. 29, 2010 (JP) .................. 2010-265402

(51) Int. Cl.
*G06K 9/00* (2006.01)
*G06K 9/46* (2006.01)
(52) U.S. Cl.
CPC ........ *G06K 9/00624* (2013.01); *G06K 9/00362* (2013.01); *G06K 9/4642* (2013.01)
USPC .......................... 382/103; 382/168

(58) Field of Classification Search
CPC .......... G06K 9/00624; G06K 9/00362; G06K 9/4642
See application file for complete search history.

(56) References Cited

U.S. PATENT DOCUMENTS

| | | | |
|---|---|---|---|
| 8,467,597 B2* | 6/2013 | Monti et al. .................. | 382/153 |
| 8,639,042 B2* | 1/2014 | Liu et al. ...................... | 382/224 |
| 2010/0082615 A1* | 4/2010 | Clinchant et al. ............. | 707/728 |

FOREIGN PATENT DOCUMENTS

| | | |
|---|---|---|
| JP | 2009-181220 A | 8/2009 |
| JP | 2009-301104 A | 12/2009 |

OTHER PUBLICATIONS

Takashi Hada, "Jitsukankyo Gazo kara no Satsuei Ichi no Tokutei", ITE Technical Report, vol. 34, No. 34, Sep. 2010, pp. 71, 72.

(Continued)

*Primary Examiner* — Shefali Goradia
(74) *Attorney, Agent, or Firm* — Westerman, Hattori, Daniels & Adrian, LLP

(57) ABSTRACT

In an object detection method and an object detector 10 using the method, HOG feature (A) of a target image is computed, and existence of a target object P in the image is judged based on HOG feature (B) pre-computed for a sample image 20 having the object P pictured therein. A classifier 18 to judge the existence of the object P in the image is constructed based on a feature pattern representing the existence of the object P obtained by calculating a plurality of the HOG features (B) having different bin numbers for each of a plurality of local areas (cells) 19 in the image 20. The existence of the object P in the image is judged by the classifier 18 based on a plurality of the HOG features (A) having different bin numbers computed for each of the local areas 19 in the image.

12 Claims, 6 Drawing Sheets

(56) References Cited

OTHER PUBLICATIONS

Yuuki Nakashima et al., "On Detecting a Human Body Direction employing HOG feature", Biomedical Fuzzy Systems Association, Oct. 9, 2010, pp. 45, 46.

Yuuki Nakashima et al., "On Detecting a Human Body Direction Using an Image Information", SICE Annual Conference 2010, Aug. 18, 2010, pp. 1521-1522.

Yuuki Nakashima et al., "Detecting a Human Body Direction Using a Feature Selection Method", ICCAS 2010, International Conference, Oct. 27, 2010, pp. 1424-1427.

Navneet Dalal et al., "Histograms of Oriented Gradients for Human Detection", Proceedings of the 2005 IEEE (CVPR'05), 1063-6919/05, 2005, 8 pages.

Hironobu Fujiyoshi, "Object Detection by Joint Feature Based on Relations of Local Features", IEICE Technical Report, The Institute of Electronics, Information and Communication Engineers, 2009, pp. 43-54.

Qiang Zhu et al., "Fast Human Detection Using a Cascade of Histograms of Oriented Gradients", Mitsubishi Electric Research Laboratories, Jun. 2006, 10 pages.

International Search Report for PCT/JP2011/077404, mailing date of Dec. 20, 2011.

* cited by examiner

FIG. 6

| | Test image | Training image | | |
|---|---|---|---|---|
| Case 1 | $I_L^{(1)}$ | $I_L^{(2)} + I_L^{(3)} + I_L^{(4)} + I_L^{(5)}$ | | |
| | $I_F^{(1)}$ | $I_F^{(2)} + I_F^{(3)} + I_F^{(4)} + I_F^{(5)}$ | | |
| | $I_R^{(1)}$ | $I_R^{(2)} + I_R^{(3)} + I_R^{(4)} + I_R^{(5)}$ | | |
| Case 2 | $I_L^{(2)}$ | $I_L^{(1)} + I_L^{(3)} + I_L^{(4)} + I_L^{(5)}$ | | |
| | $I_F^{(2)}$ | $I_F^{(1)} + I_F^{(3)} + I_F^{(4)} + I_F^{(5)}$ | | |
| | $I_R^{(2)}$ | $I_R^{(1)} + I_R^{(3)} + I_R^{(4)} + I_R^{(5)}$ | | |
| Case 3 | $I_L^{(3)}$ | $I_L^{(1)} + I_L^{(2)} + I_L^{(4)} + I_L^{(5)}$ | | |
| | $I_F^{(3)}$ | $I_F^{(1)} + I_F^{(2)} + I_F^{(4)} + I_F^{(5)}$ | | |
| | $I_R^{(3)}$ | $I_R^{(1)} + I_R^{(2)} + I_R^{(4)} + I_R^{(5)}$ | | |
| Case 4 | $I_L^{(4)}$ | $I_L^{(1)} + I_L^{(2)} + I_L^{(3)} + I_L^{(5)}$ | | |
| | $I_F^{(4)}$ | $I_F^{(1)} + I_F^{(2)} + I_F^{(3)} + I_F^{(5)}$ | | |
| | $I_R^{(4)}$ | $I_R^{(1)} + I_R^{(2)} + I_R^{(3)} + I_R^{(5)}$ | | |
| Case 5 | $I_L^{(5)}$ | $I_L^{(1)} + I_L^{(2)} + I_L^{(3)} + I_L^{(4)}$ | | |
| | $I_F^{(5)}$ | $I_F^{(1)} + I_F^{(2)} + I_F^{(3)} + I_F^{(4)}$ | | |
| | $I_R^{(5)}$ | $I_R^{(1)} + I_R^{(2)} + I_R^{(3)} + I_R^{(4)}$ | | |

OBJECT DETECTION METHOD AND OBJECT DETECTOR USING THE METHOD

TECHNICAL FIELD

The present invention relates to an object detection method and an object detector using the method, by the method whether a human or a specific object exists in an image or not is detected.

BACKGROUND ART

Recently, in the field of ITS (Intelligent Transport System), attention has been drawn to object detection techniques in which a pedestrian, a vehicle, a traffic sign, etc. in an image taken by a car-mounted camera are detected by using IT (Information Technology).

Although detection of an object in an image taken outdoors is not easy due to changes in a lighting condition, occlusion (overlap between objects in the image), etc., it has been studied enthusiastically all over the world because it is efficient for reducing traffic accidents.

As a method for detecting an object in an image, a method employing an HOG (Histograms of Oriented Gradients) feature is known. The HOG feature can represent a shape of the object existing in the image. The HOG feature is derived from intensity information of each pixel of the image, and is represented as a histogram obtained based on an orientation and a magnitude of an intensity gradient at a local area (cell) in the image.

Non Patent Literature 1 discloses a method employing the HOG feature and an SVM (Support Vector Machine). In this method, the HOG feature of a cell (block) having a certain size is calculated successively while the cell is being moved in the image to detect whether a human exists in the image or not.

In addition, as methods for detecting objects employing the HOG feature, Non Patent Literature 2 discloses a method employing a Joint feature representing co-occurrence between a plurality of the HOG features, and Non Patent Literature 3 discloses a method in which a plurality of the HOG features are computed by changing sizes of blocks.

CITATION LIST

Non Patent Literature

[Non Patent Literature 1] N. Dalal and B. Triggs, "Histograms of Oriented Gradients for Human Detection", IEEE CVPR, pp. 886-893, 2005

[Non Patent Literature 2] Hironobu Fujiyoshi, "Object Detection by Joint Feature Based on Relations of Local Features", Workshop of the Institute of Electronics, Information and Communication Engineers, 2009

[Non Patent Literature 3] Q. Zhu, S. Aviden, M. Yeh, and K. Cheng. "Fast Human Detection Using a Cascade of Histograms of Oriented Gradients", IEEE CVPR, June 2006

SUMMARY OF INVENTION

Technical Problem

However, in the aforementioned conventional methods, a bin number (the number of bins) of the HOG feature is a specific value. The applicant found from a study that depending on a location of the cell in the image, an HOG feature unsuitable as a reference to identify the object was obtained.

Thus, the applicant focuses on increasing precision of object detection by changing the conventional method in which as classifier to detect existence of the object is constructed by using the HOG feature including the specific bin number. In view of the above circumstances, the present invention has an objective to provide an object detection method and an object detector using the method, in which a plurality of HOG features having different bin numbers are computed at each of locations of a local area in an image to construct a reference to detect an object.

Solution to Problem

To accomplish the above objective, an object detection method according to an aspect of the present invention is an object detection method employing an HOG feature (A) representing an intensity gradient of a target image for detecting existence of a target object in the target image based on an HOG feature (B) representing an intensity gradient computed in advance on a sample image capturing the target object, the object detection method comprising the steps of: computing a plurality of the HOG features (B) having different bin numbers for each of a plurality of local areas in the sample image to obtain a feature pattern representing the existence of the target object; constructing a classifier to judge the existence of the target object in the target image based on the feature pattern; and judging the existence of the target object in the target image by the classifier based on a plurality of the HOG features (A) having different bin numbers computed for each of a plurality of local areas in the target image.

In the method according to the aspect of the present invention, it is preferable that the target object is a human, and the classifier detects an entire body, an upper body, and a lower body of the target object in the target image based on the plurality of the HOG features (A) having the different bin numbers, detects each of directions of the entire body, the upper body, and the lower body of the detected target object, and judges a direction of the target object as a whole. Here, it can be judged that the most frequently detected direction among the detected directions of the entire body, the upper body, and the lower body is the direction of the object as a whole.

In the method according to the aspect of the present invention, it is preferable that, from a plurality of bins of each of the HOG features (B), the bin effective to obtain the feature pattern is selected by a learning algorithm.

In the method according to the aspect of the present invention, it is preferable that the learning algorithm is AdaBoost.

To accomplish the above object, an object detector according to an aspect of the present invention is an object detector employing an HOG feature (A) representing an intensity gradient of a target image for detecting existence of a target object in the target image based on an HOG feature (B) representing an intensity gradient computed in advance on a sample image capturing the target object, the object detector comprising: a calculator computing a plurality of the HOG features (B) having different bin numbers for each of a plurality of local areas in the sample image to obtain a feature pattern representing the existence of the target object, and further computing a plurality of the HOG features (A) having different bin numbers for each of a plurality of local areas in the target image; and a classifier constructed by the calculator based on the feature pattern, and judging the existence of the target object in the target image based on the plurality of the HOG features (A) having the different bin numbers computed by the calculator.

In the object detector according to the aspect of the present invention, it is preferable that the target object is a human, and the classifier detects an entire body, an upper body, and a lower body of the target object in the target image based on the plurality of the HOG features (A) having the different bin numbers, detects each of directions of the entire body, the upper body, and the lower body of the detected target object, and judges a direction of the target object as a whole.

Here, it can be judged that the most frequently detected direction among the detected directions of the entire body, the upper body, and the lower body is the direction of the object as a whole.

In the object detector according to the aspect of the present invention, it is preferable that, from a plurality of bins of each of the HOG features (B), the calculator selects the bin effective to obtain the feature pattern by a learning algorithm.

In the object detector according to the aspect of the present invention, it is preferable that the learning algorithm is Ada-Boost.

Advantageous Effects of Invention

In the object detection method and the object detector according to the aspect of the present invention, the classifier to judge the existence of the target object in the target image is constructed based on the feature pattern representing the existence of the target object obtained by computing the plurality of the HOG features (B) having the different bin numbers for each of the plurality of the local areas in the sample image, and the existence of the target object in the target image is judged by the classifier based on the plurality of the HOG features (A) having the different bin numbers computed for each of the plurality of the local areas in the target image. Therefore, by computing the plurality of the HOG features (B) having the different bin numbers, another bin (component) of the same histogram or a bin (component) of another HOG feature (B) having a different bin number suitable as a reference to detect the existence of the target object is used without using a bin (component) of a HOG feature (B) unsuitable as the reference to detect the existence of the target object, thus a feature composed of the component efficient for detecting the object can be extracted, and precision of evaluating the existence of the target object can be enhanced.

In the method and the object detector according to the aspect of the present invention, when the target object is the human, and the classifier detects the entire body, the upper body, and the lower body of the target object in the target image based on the plurality of the HOG features (A) having the different bin numbers, and judges the direction of the target object as a whole by detecting each of the directions of the entire body, the upper body, and the lower body of the detected target object, more parts are used to judge compared to when only the entire body of the target object is used to judge the direction of the target object as a whole, thereby the precision of evaluating can be improved.

In the method and the object detector according to the aspect of the present invention, to select the bin effective to obtain the feature pattern by the learning algorithm from the plurality of the bins of each of the HOG features (B), the feature pattern serving as a base to construct the classifier can be obtained from the bins suitable as the references to detect the target object, and thereby, the target object can certainly be detected.

BRIEF DESCRIPTION OF DRAWINGS

FIG. 6 is an explanatory diagram illustrating a training image and a test image used in an experimental example and comparative examples 1, 2.

DESCRIPTION OF EMBODIMENTS

Referring to the accompanying drawings, an embodiment of the present invention will be described for a better understanding of the invention. As shown in FIGS. 1 to 5, by an object detection method and an object detector 10 using the method according to the embodiment, a HOG feature (A) representing an intensity gradient of a target image (i.e., an image to be examined) is computed, and whether a target object (i.e., an object to be detected) exists in the target image or not is detected based on a pre-computed HOG feature (B) representing an intensity gradient of a sample image 20 having the target object pictured therein.

Hereinafter, further details will be described.

Figure 1:
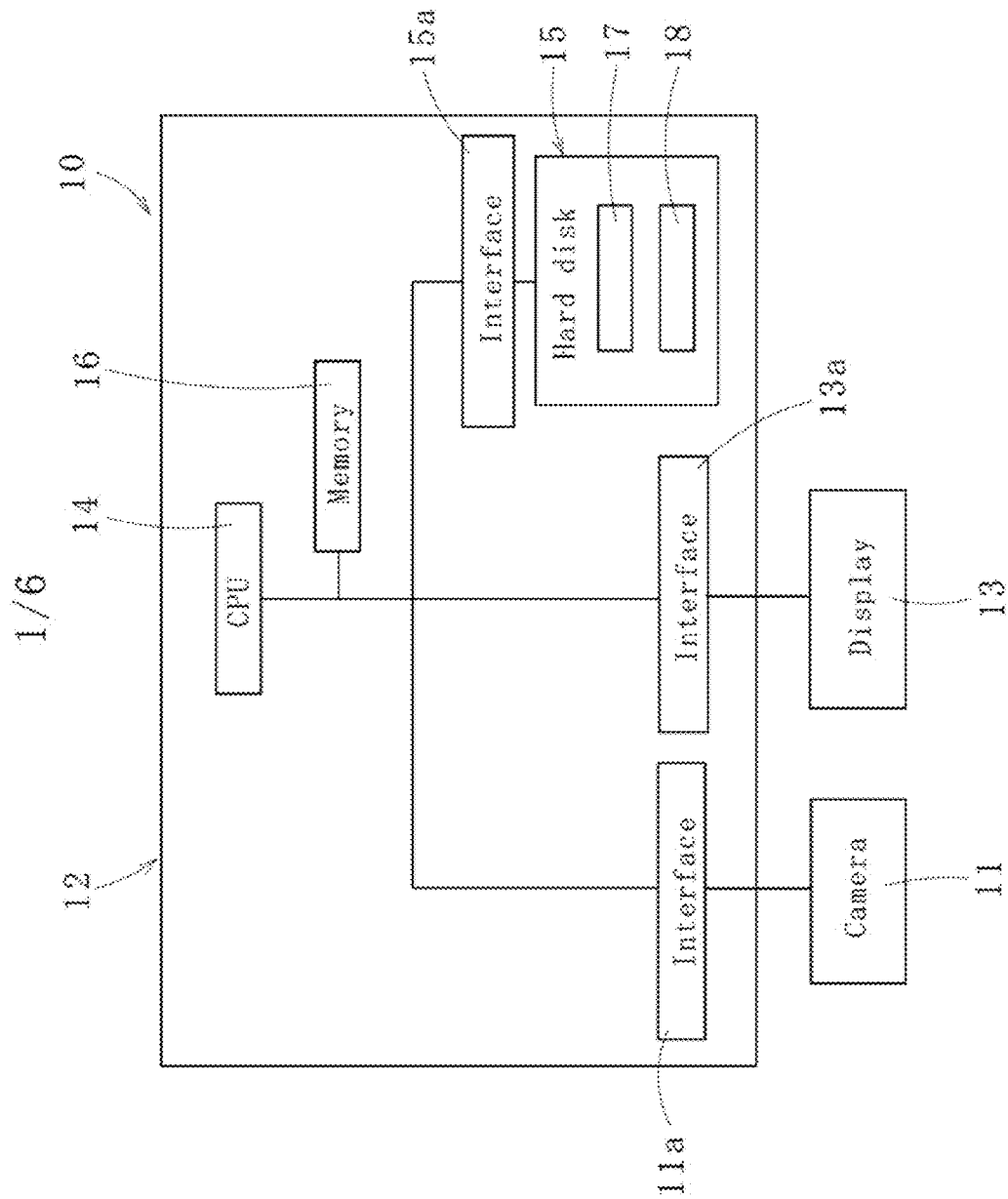
FIG. 1 is a block diagram illustrating an object detector according to an embodiment of the present invention.

As shown in FIG. 1, the object detector 10 according to the embodiment mainly includes a camera 11, a computer 12 (e.g., a microcomputer), and a display 13, and is mounted in a vehicle, for example.

The computer 12 is connected to the camera 11 via signal connection, judges whether the target object P (see FIG. 2) exists in an image taken by the camera 11 or not, further judges a direction of the target object P if the target object P exists in the image, and shows a judgment result on the display 13.

The computer 12 includes a CPU 14 for data processing, a hard disk 15 with various programs installed therein, and a memory 16 to which the CPU 14 can access.

Figure 2:
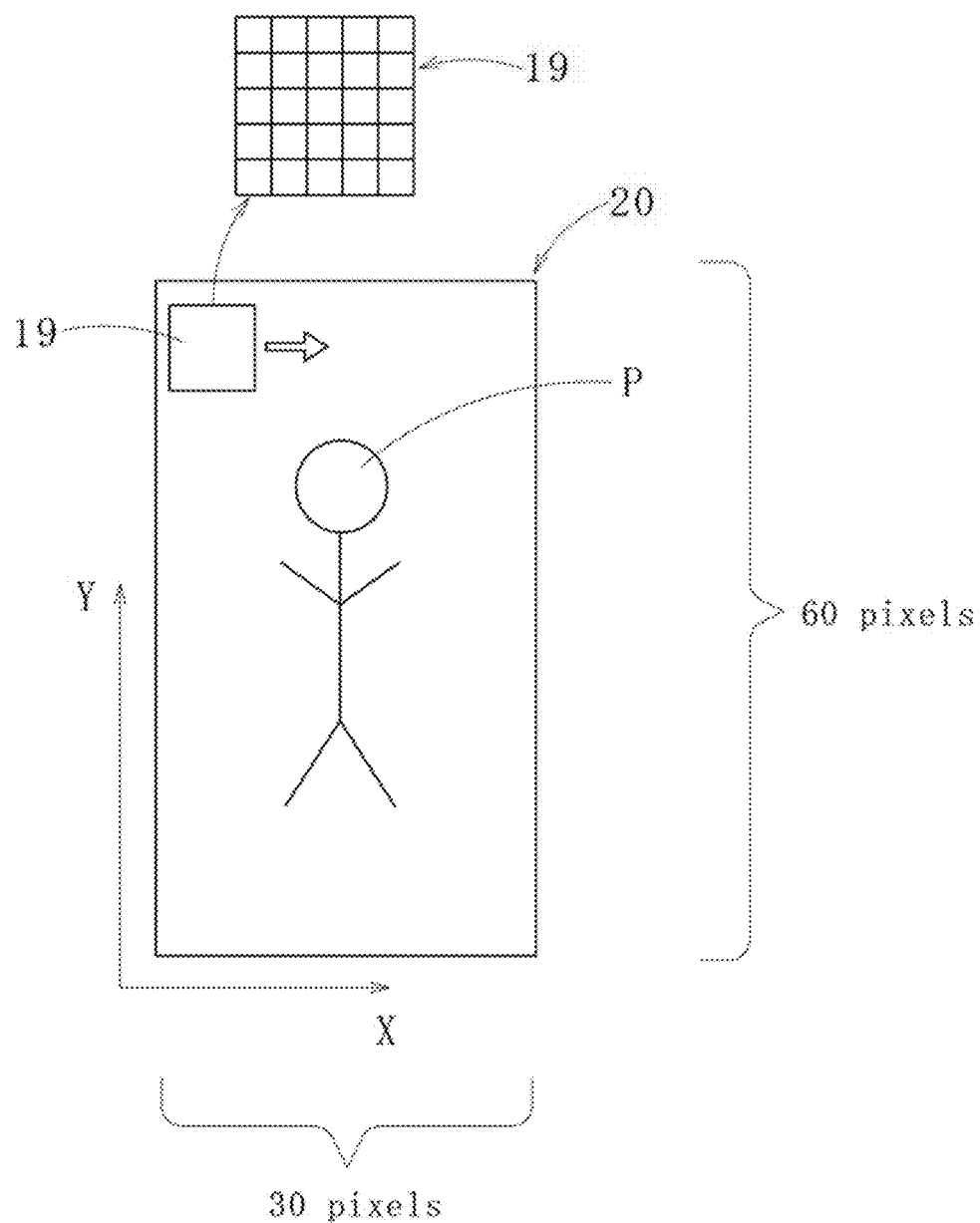
FIG. 2 is an explanatory diagram illustrating an object detection method according to the embodiment of the present invention.

The hard disk 15 includes a calculator 17 which calculates a HOG feature representing an intensity gradient of the image taken by the camera 11, and a classifier 18 which is constructed by the calculator 17 and judges whether the target object P exists in the image or not. The word "image" herein includes two meanings, i.e., the sample image 20 having the target object P pictured therein as shown in FIG. 2 and the target image for which whether the target object P exists therein or not is judged, and both of the sample image 20 and the target image are taken by the camera 11. (Hereinafter, the single word "image" denotes two types of the images, i.e., the sample image 20 and the target image.)

Here, the calculator 17 and the classifier 18 are programs stored in the hard disk 15. The computer 12 also includes interfaces 11a, 13a, and 15a which respectively connect a circuit including the CPU 14 to the camera 11, the display 13, and the hard disk 15 via signal connection.

The calculator 17 can compute a plurality of HOG features of a part of the image taken by the camera 11 inside a certain sized cell (local area) 19 as shown in FIG. 2, where each of the HOG features includes a different bin number. The word "HOG feature" herein denotes both of the HOG feature (A)

computed from the target image and the HOG feature (B) computed from the sample image 20. (The same shall apply hereinafter.)

Figure 3:
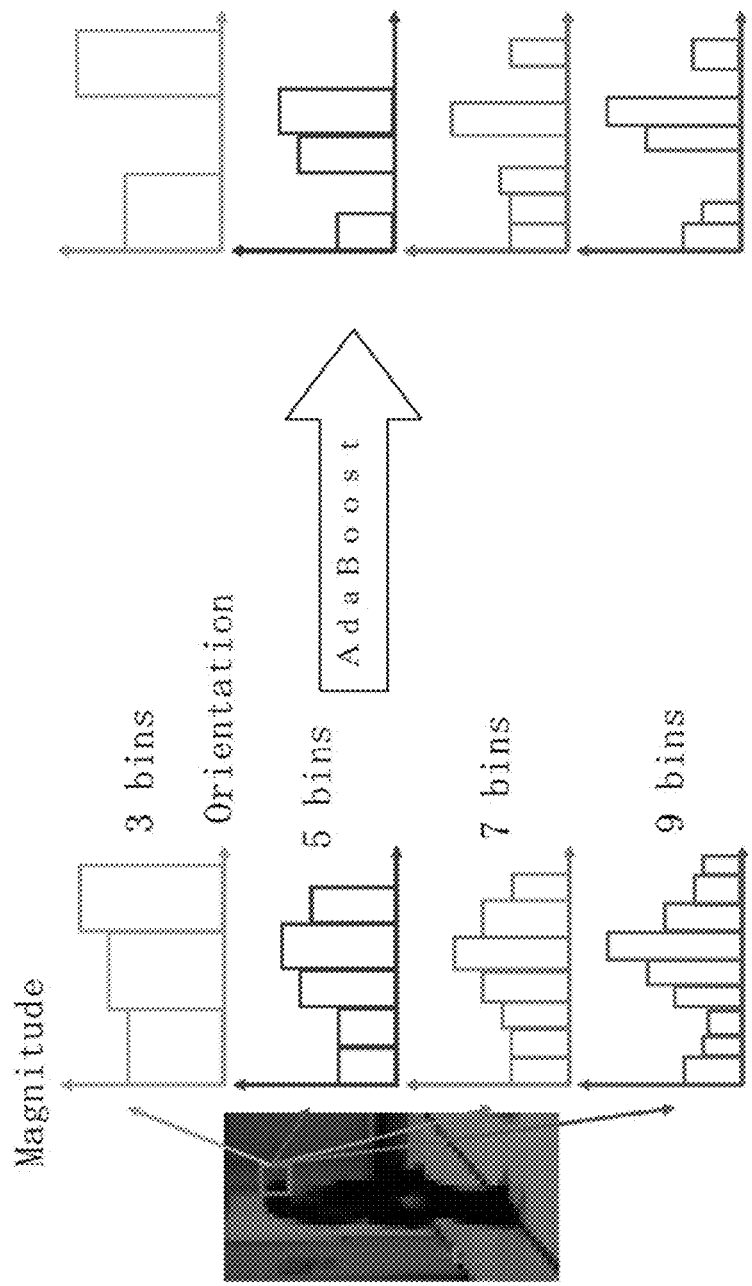
FIG. 3 is an explanatory diagram illustrating the method.

As shown in FIG. 3, the HOG feature is a feature represented by a histogram of the intensity gradient of the cell 19 including an orientation and a magnitude of the intensity gradient respectively set as a horizontal axis and a vertical axis of the histogram. Here, an orientation of 0 to 180 degrees is divided into a plurality of orientation ranges, and the magnitude of the intensity gradient corresponding to each of the orientation ranges is represented as a height of the bin of the histogram. In the image, the intensity gradient increases at a position where an outline of the object (a boundary between the object and a background) is located, thus a shape of the object in the image can be detected by obtaining the HOG feature. Therefore, a pattern of the HOG feature (B) (hereinafter simply referred to as a "feature pattern") representing the target object P (i.e., a human in this embodiment) is learned from the sample image 20 in advance, and the classifier 18 can be constructed to judge whether the target object exists in the target image or not based on the learned feature pattern.

In this embodiment, a size of the image taken by the camera 11 is 30×60 pixels, and a size of the cell 19 is 5×5 pixels as shown in FIG. 2. The calculator 17 computes the magnitude m of the intensity gradient by Equation 1 and the orientation θ of the intensity gradient by Equation 2 based on the intensity of each pixel in the cell 19.

[Mathematical Expression 1]

$$m(x, y) = \sqrt{f_x(x, y)^2 + f_y(x, y)^2} \quad \text{(Equation 1)}$$

$$\theta(x, y) = \tan^{-1}\frac{f_y(x, y)}{f_x(x, y)} \quad \text{(Equation 2)}$$

In Equation 1 and 2, fx(x, y) denotes a difference of the intensity in an X-axis direction (a horizontal direction) and fy(x, y) denotes a difference of the intensity in a Y-axis direction (a vertical direction) shown in FIG. 2. Here, let a pixel intensity at a location (coordinates) (x, y) in the image be denoted by I(x, y), and fx(x, y) and fy(x, y) can be obtained respectively by Equation 3 and Equation 4.

[Mathematical Expression 2]

$$f_x(x,y)=I(x+1,y)-I(x-1,y) \quad \text{(Equation 3)}$$

$$f_y(x,y)=I(x,y+1)-I(x,y-1) \quad \text{(Equation 4)}$$

While the cell 19 is being moved in the image, the calculator 17 computes the magnitude m and the orientation θ of the intensity gradient of the area inside the cell 19 based on the intensity of each of the pixels in the cell 19 every time the cell 19 moves.

The cell 19 moves by 1 pixel from one side to the other side of both ends in the X-axis direction of the image. After the cell 19 arrives the other side in the X-axis direction, the cell 19 moves to a position of the one side in the X-direction and different by 1 pixel in the Y-direction. Thereafter, the cell 19 moves by 1 pixel in the X-axis direction.

The calculator 17 continues moving the cell 19 until the cell 19 finishes moving through all of the areas of the image, and calculates N (N is larger than or equal to 2) HOG features having different bin numbers every time the cell 19 moves. Therefore, from a start until an end of the cell 19's moving, the calculator 17 computes the N HOG features for each of 1456 positions (1456=(30−5+1)×(60−5+1)) of the cell 19, totaling the 1456N HOG features. In this embodiment, for each of the positions of the cell 19 in the image, the 4 HOG features (N=4) in total having 3, 5, 7, and 9 bins are computed.

For a plurality of the sample images 20 having a human as the target object P pictured therein (The word "human" herein does not denote a specific person but denotes an object belonging to a genre of human among various matters, and the same shall apply hereinafter), the calculator 17 computes N HOG features (B) having different bin numbers for each of positions of the cell 19 in the sample image 20, obtains a feature pattern indicating existence of the human in the sample image 20 by using the N HOG features (B) computed on the sample image 20, and constructs the classifier 18 based on the feature pattern. The calculator 17 then computes N HOG features (A) having different bin numbers for each of positions of the cell 19 in the target image, and gives the computed HOG features (A) to the classifier 18.

The classifier 18 judges whether the human exists or not in the target image based on the HOG feature (A) computed on the target image given from the calculator 17. Also, if the classifier 18 detects that the human exists in the target image, the classifier 18 detects an entire body, an upper body, and a lower body of the human in the target image based on the HOG feature (A) computed by the calculator 17 on the target image. The classifier 18 then detects a direction of each of the entire body, the upper body, and the lower body of the detected human to judge a direction of the human as a whole in the target image.

Hereinafter, a method for judging the existence and a direction of the human in the target image (i.e., the object detection method according to the embodiment of the present invention) will be described.

The method includes a preliminary phase in which the classifier 18 to judge the existence and the direction of the human in the target image is constructed, and a judgment phase in which the classifier 18 judges the existence and the direction of the human in the target image.

The preliminary phase includes a process in which the feature pattern representing the existence of the human is obtained by computing the N HOG features (B) having the different bin numbers for each of a plurality of the different positions (i.e., a plurality of the local areas) of the cell 19 in the sample image 20, and a plurality (e.g., the same number of the HOG features (B)) of HOG features having different bin numbers for each of a plurality of different positions of a cell in an unillustrated image in which no human exists, and a process in which the classifier 18 to judge the existence of the human in the target image is constructed based on the feature pattern.

The judgment phase includes a process in which the classifier 18 judges the existence and the direction of the human in the target image based on the N HOG features (A) having the different bin numbers computed for each of the plurality of the different positions of the cell 19 in the target image.

The HOG feature computed by the calculator 17 in the preliminary phase or the judgment phase is derived by determining a bin number composing the HOG feature and obtaining an element (a size) of each of the bins.

Let a first location (position) of the cell 19 in the image for which the HOG feature is computed be a $1^{st}$ location of the cell 19 and a location of the cell 19 after the cell 19 moves k−1 times be a $k^{th}$ location of the cell 19 (k is an integer number equal to or larger than 2), and an element $a^{kb}_i$ of an $i^{th}$ bin of the HOG feature having $B_b$ bins at the $k^{th}$ location of the cell 19 can be obtained by Equation 5.

[Mathematical Expression 3]

$$a^{kb}{}_i = \sum_{(x,y) \in cell_k} m(x, y) \quad \text{(Equation 5)}$$

$$\text{if } (i-1)\pi/B_b < \theta(x, y) \le i\pi/B_b$$

Here, b in Equation 5 is an index (ID) representing a correspondence between $a^{kb}{}_i$ and $B_b$, and in this embodiment, $B_0=3$, $B_1=5$, $B_2=7$, $B_3=9$ where b=0, 1, 2, 3, and for $a^{kb}{}_i$ and $B_b$, $a^{k0}{}_i$, $a^{k1}{}_i$, $a^{k2}{}_i$, and $a^{k3}{}_i$ correspond respectively to $B_0$, $B_1$, $B_2$, and $B_3$.

Figure 4:
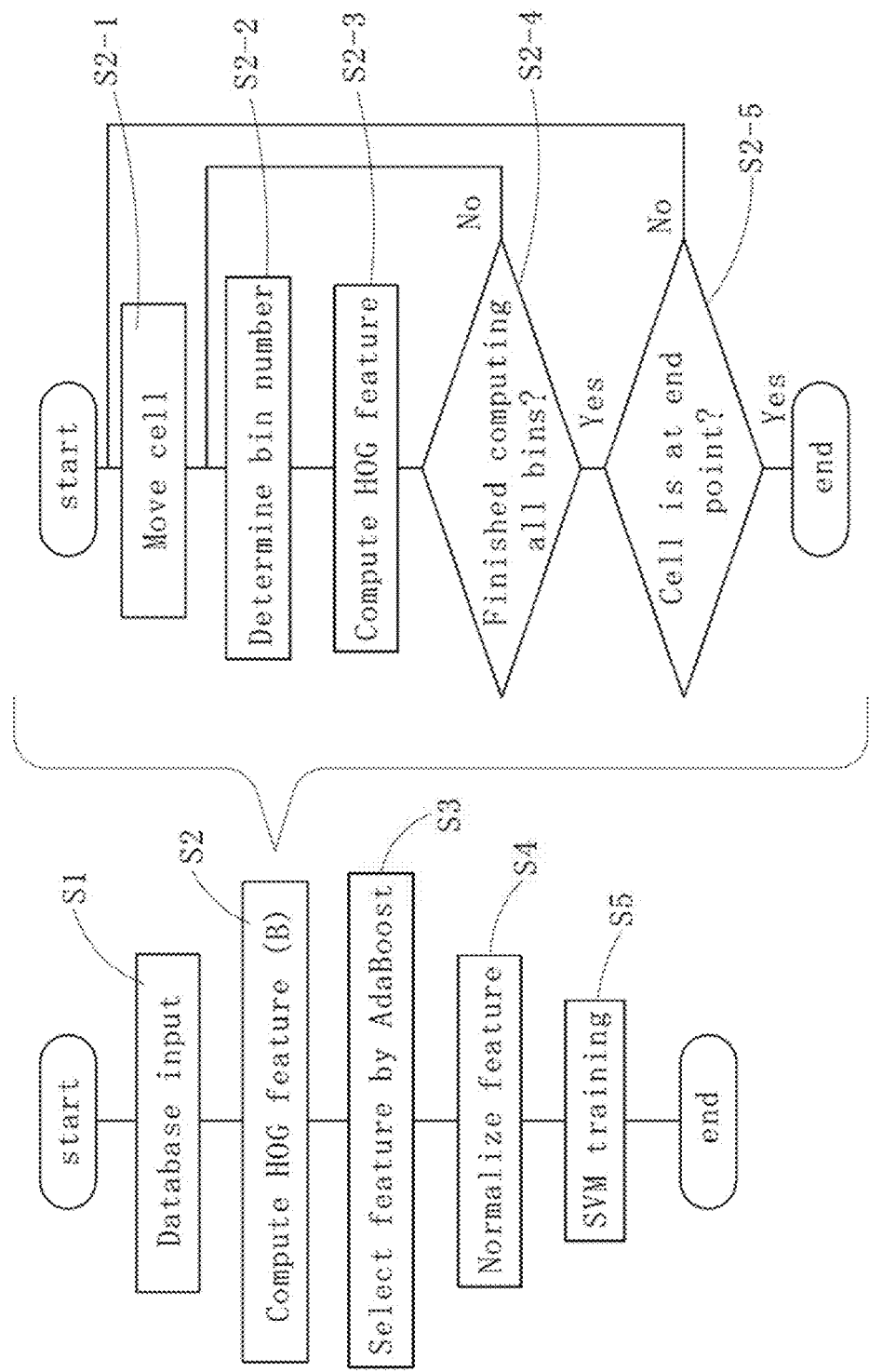
FIG. 4 is a flow chart illustrating a preliminary phase of the method.

In the preliminary phase, firstly, as shown in FIG. 4, a plurality of the sample images 20 having the humans pictured therein are taken by the camera 11, and the sample images 20 are entered as a database into the hard disk 15 of the computer 12 via a memory medium (e.g., a USB memory stick) or a communication network to be stored in the hard disk 15. (Step S1)

In each of the sample images 20, a human facing front, left, or right to the camera 11 is pictured.

Next, for each of the plurality of the sample images 20 stored in the hard disk 15, the plurality of the HOG features (B) having the different bin numbers are computed. (Step S2) Here, the bin numbers of the HOG features (B) to be computed are predetermined, and in this embodiment, the HOG features (B) having 3, 5, 7, and 9 bins are computed.

In Step S2, as shown in FIG. 4, the cell 19 moves through the sample image 20 (Step S2-1), the calculator 17 determines a bin number, for which the HOG feature (B) is computed, from the predetermined bin numbers every time the cell 19 moves (Step S2-2), and then the calculator 17 computes the HOG feature (B) having the determined bin number (Step S2-3).

The calculator 17 computes the HOG features (B) having the different bin numbers with the cell 19 fixed in the sample image 20, and after computing all of the HOG features (B) having the predetermined bin numbers, moves the cell 19. (Step S2-4)

The HOG features (B) are successively computed for each of the sample images 20 from a starting point (the $1^{st}$ location of the cell 19) of the sample image 20 until the cell 19 moves and locates at an end point (a $1456^{th}$ location of the cell 19) of the sample image 20. (Step S2-5)

As shown in FIG. 3, by an learning algorithm AdaBoost, the calculator 17 selects a bin effective to obtain the feature pattern (i.e., a bin suitable as a reference to detect the target object) from the computed plurality of the bins of each of the HOG features (B). (Step S3)

For example, in order to detect a human facing right, the sample image of a human facing right is used, each of the HOG features having 3, 5, 7, and 9 bins of all of the cells in the image is calculated, and feature selection is conducted by using the AdaBoost algorithm to extract the HOG feature having a bin effective to represent a front head, for example, of the human facing right. FIG. 3 shows that $1^{st}$ and $3^{rd}$ bins are selected for the HOG feature having the bin number of 3, $1^{st}$, $3^{rd}$, $4^{th}$ bins are selected for the HOG feature having the bin number of 5, $1^{st}$, $2^{nd}$, $3^{rd}$, $5^{th}$, $7^{th}$ bins are selected for the HOG feature having the bin number of 7, and $1^{st}$, $2^{nd}$, $5^{th}$, $6^{th}$, $8^{th}$ bins are selected for the HOG feature having the bin number of 9. Thus, although the HOG features of a cell containing the front head of the human facing right initially includes (3+5+7+9) components, AdaBoost enables the HOG features to be composed of only (2+3+5+5) components effective to detect the human facing right (an object detection).

Similarly, for other parts in the sample image, for example, for each of cells containing one of an upper back, a middle front, and a bottom of the body of the human, an upper front, a middle back, and a lower front of legs of the human, etc., each of the HOG features having the bin numbers of 3, 5, 7, and 9 is computed, and the feature selection is conducted by using the AdaBoost algorithm. Thereby, from each of the HOG features having the bin numbers of 3, 5, 7, and 9, the HOG features having only effective bins to represent each of body parts of the human facing right are obtained.

Thus, in each of the HOG features having the bin numbers of 3, 5, 7, and 9, bins of the HOG feature unsuitable as references to detect the existence of the human facing right are not used, but other bins (components) of the same histogram or bins (components) of the another HOG feature (B) having a different bin number suitable as references to detect the existence of the human facing right are used. Thereby, a feature composed of the components effective to detect the human facing right can be extracted, and precision of evaluating the existence of the target object can be improved.

In order to detect a human facing front, the sample image of a human facing front is used, and in order to detect a human facing left, the sample image of a hum facing left is used, and a process similar to the above is conducted. Thereby, the HOG features having only effective bins to represent each of body parts of the human facing front are obtained from each of the HOG features having the bin numbers of 3, 5, 7, and 9 of the human facing front, and the HOG features having only effective bins to represent each of body parts of the human facing left are obtained from each of the HOG features having the bin numbers of 3, 5, 7, and 9 of the human facing left.

By providing this Step S3, only the effective bins to judge the existence and the direction of the human in the image can be set as a base to calculate the feature pattern. Here, to select the effective bins, a data compression method and an algorithm other than AdaBoost, e.g., PCA (Principal Component Analysis), can also be used.

After Step S3 is completed, each element $a^{kb}{}_i$ of the bins of the HOG feature (B) selected by AdaBoost is normalized by Equation 6. (Step S4)

[Mathematical Expression 4]

$$a'^{kb}{}_i = \frac{a^{kb}{}_i}{\sqrt{\|A^{kb}\|^2 + \varepsilon}} (\varepsilon > 0) \quad \text{(Equation 6)}$$

Here, $a'^{kb}{}_i$ is a normalized element, $A^{kb}$ ($=[a^{kb}{}_1, a^{kb}{}_2, \ldots a^{kb}{}_{Bb}]$) is a gradient orientation histogram having Bb orientation (e.g., 5 orientations), and $\varepsilon$ is a coefficient to prevent a denominator from being 0.

After Step S4 is completed, by SVM training, which is a pattern classification method, the calculator 17 obtains the feature pattern representing the existence of the human in the image based on the sample image 20, and by using the feature pattern, constructs the classifier 18 in the hard disk 15. Here, the classifier 18 (1) judges whether the human exists or not (detects and evaluates the entire body of the human), (2) mechanically separates the upper body and the lower body from the entire body of the human, and (3) evaluates the direction of the human. (Step S5)

Hereinafter, each of (1), (2), (3) will be described.

(1) Judgment of the Existence of the Human

By using the sample image 20, a plurality of the HOG features (the HOG features selected to detect the human facing front, the HOG features selected to detect the human facing left, and the HOG features selected to detect the human facing right), which are the feature patterns representing the existence of the human in the image, are selected by Ada-Boost algorithm, and a detection means (a part of the classifier 18) is formed by combining the HOG features.

Here, the detection means has a function to output a positive output value upon detecting the entire body of the human and a negative output value upon judging that the human does not exist. Since a result (the positive output value) of the detection means' judging that the human exists in the sample image 20 and a result (the negative output value) of the detection means' judging that the human does not exist in an image when the human does not exist therein are learned using SVM, the detection means can determine an output value to detect and evaluate the entire body of the human (a threshold for human detection and judgment).

Thereby, a judgment means (a part of the classifier 18) is formed. The judgment means obtains an output value when the target image is evaluated by using the detection means, compares the obtained output value and the threshold for human detection and judgment, and judges that the human exists if the output value is equal to or larger than the threshold and the human does not exist if the output value is less than the threshold.

(2) Detection of the Upper Body and the Lower Body of the Human

Upon detection of the entire body of the human, each of the upper body and the lower body of the detected human can be identified by mechanically dividing the entire body in two parts, i.e., top and bottom parts. Therefore, by forming a division means (a part of the classifier 18) which divides the HOG features selected to detect the entire body of the human into the HOG feature effective to detect the upper body and the HOG feature effective to detect the lower body, an output value corresponding to a case where the upper body is detected and an output value corresponding to a case where the lower body is detected can be obtained, respectively.

(3) Judgment of the Direction of the Human

The output value of the judgment means when the entire body of the human detected and the direction (front, left, or right) of the human in the sample image 20 are learned using SVM, thus, in 1 vs. 1 method, a threshold for evaluating a dominance (for a dominance evaluation) of whether the human is facing right or front, a threshold for evaluating a dominance of whether the human is facing front or left, and a threshold for evaluating a dominance whether the human is facing left or right are each determined. Also, in 1 vs. rest method, a threshold for evaluating a dominance of whether the human is facing right or another direction (i.e., front or left), a threshold for evaluating a dominance of whether the human is facing left or another direction (i.e., front or right), and a threshold for evaluating a dominance whether the human is facing front or another direction (i.e., right or left) are each determined. Likewise, for the upper body and the lower body, each of the thresholds is obtained in the 1 vs. 1 method and the 1 vs. rest method.

In a case where it is judged that the human exists in the image, by comparing each of the output values and each of the thresholds by the 1 vs. 1 method and the 1 vs. rest method for the entire body, the upper body, and the lower body of the human, each of the dominances of whether the human is facing right or front, whether facing front or left, whether facing left or right, whether facing right or another, whether facing left or another, and whether facing front or another is evaluated. All of results of evaluating the dominances are combined, and a direction most frequently detected is determined as the direction of the human as a whole (a direction of the target object as a whole). Thereby, a body-direction detection means (a part of the classifier 18) is formed.

Here, by storing programs each performing a function of the detection means, the judgment means, the division means, and the body-direction detection means in the hard disk 15, the classifier 18 can be constructed in the hard disk 15.

By Step S5, the classifier 18 is constructed and the preliminary phase is completed.

In the judgment phase, based on the HOG feature (A) computed by the calculator 17 on the target image, the classifier 18 judges whether the human exists in the target image or not, and evaluates the direction of the human if the human exists.

Figure 5:
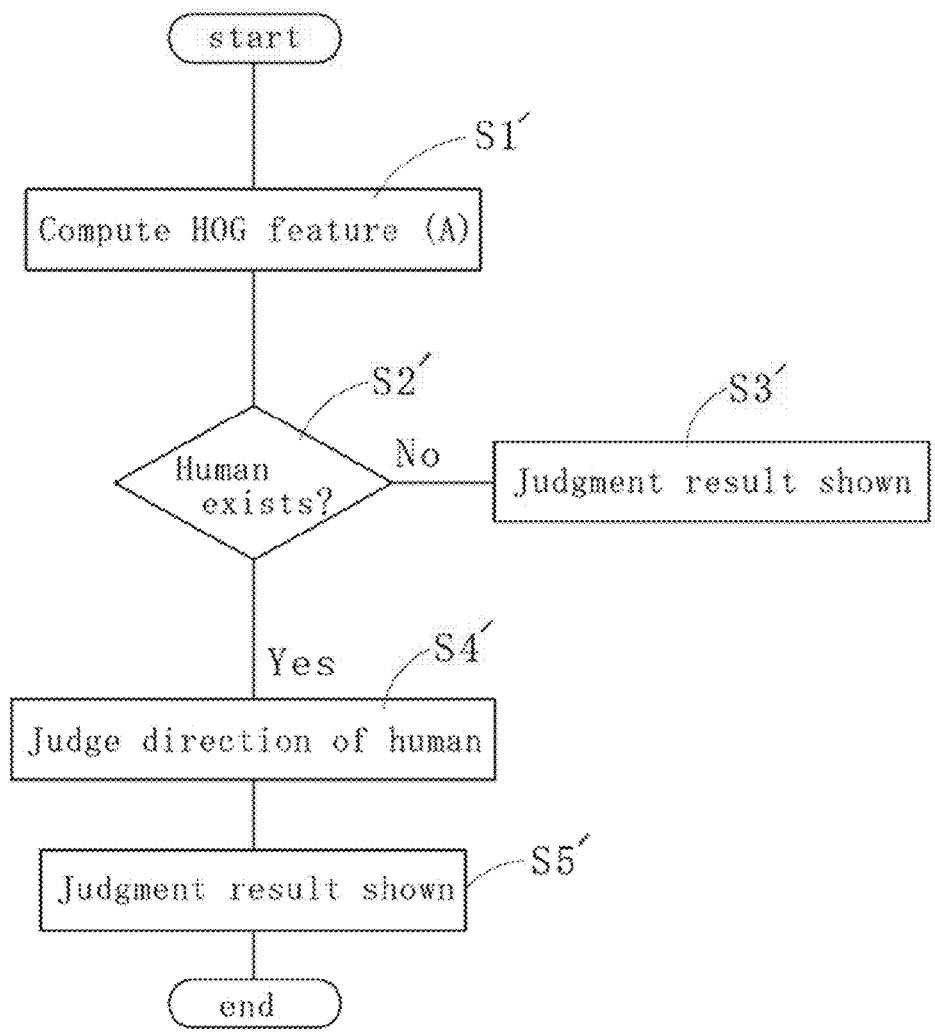
FIG. 5 is a flow chart illustrating a judgment phase of the method.

As shown in FIG. 5, while moving the cell 19 in the target image, the calculator 17 computes the plurality of the HOG features (A) having the different bin numbers every time the cell 19 moves, and gives the HOG features (A) to the classifier 18. (Step S1')

Based on the HOG features (A) given by the calculator 17, the classifier 18 judges whether the human exists in the target image or not. (Step S2')

If the classifier 18 judges that the human does not exist in the image, a judgment result indicating non-existence of the human is shown in the display 13. (Step S3')

If the classifier 18 judges that the human exists in the target image, the classifier 18 detects the entire body, the upper body, and the lower body of the human in the target image based on the HOG features (A) of the target image, detects each of the directions of the entire body, the upper body, and the lower body of the detected target object, and determines the direction of the human as a whole. (Step S4')

Thereafter, a judgment result indicating existence of the human and the direction thereof is shown in the display 13. (Step S5')

In Step S4', the classifier 18 performs a vote on each of the entire body, the upper body, and the lower body of the human detected in the target image by the 1 vs. 1 method and the 1 vs. rest method. Here, in the 1 vs. 1 method, the 3 dominance evaluations (votes) of whether the human is facing right or front, whether facing front or left, and whether facing left or right are performed, and in the 1 vs. rest method, the 3 dominance evaluations (votes) of whether the human is facing right or another direction, whether facing left or another direction, and whether facing front or another direction are performed. Thereafter, based on results of the votes (results of the 18 dominance evaluations in total, evaluating which of the 6 directions each of the entire body, the upper body, and the lower body is facing), a direction with the most votes is determined as the direction of the human as a whole in the target image.

Each of the votes is performed by always selecting one of "positive" and "negative". For the 1 vs. 1 method, "positive" and "negative" denote as follows:

(a) front: positive, right: negative
(b) right: positive, left: negative
(c) left: positive, front: negative In the 1 vs. rest method, "positive" and "negative" denote as follows:

(d) front: positive, right or left (a direction other than front): negative (e) right: positive, front or left (a direction other than right): negative (f) left: positive, right or front (a direction other than left): negative For example, in the body-direction detector, if the dominance evaluation of whether the human is facing right or front is negative, the dominance evaluation of whether facing front or left is positive, the dominance evaluation of whether facing left or right is positive in the 1 vs. 1 method, and the dominance evaluation of whether the human is facing right or another direction is positive, the dominance evaluation of whether facing left or another direction is negative, the dominance evaluation of whether facing front or another direction is negative in the 1 vs. rest method, all of the dominance evaluations in the 1 vs. 1 method indicate "right", and the dominance evaluations in the 1 vs. rest method indicate "right", "a direction other than left (i.e., right or front)", and "a direction other than front (i.e., right or left)". Therefore, the votes in total include 5 for "right", 2 for "front", and 1 for "left", and the body-direction detector outputs a judgment that the human is facing right.

Experimental Example

Firstly, 500 images each having a human facing left pictured therein (an assembly of which is denoted by $I_L$), 500 images each having a human facing front pictured therein (an assembly of which is denoted by $I_F$), and 500 images each having a human facing right pictured therein (an assembly of which is denoted by $I_R$) were prepared. Each of the 500 images was then divided into 5 sets of the 100 images as follows:

The 500 images each having the human facing left pictured therein $(I_L)$=100 images $(I_L^{(1)})$+100 images $(I_L^{(2)})$+100 images $(I_L^{(3)})$+100 images $(I_L^{(4)})$+100 images $(I_L^{(5)})$ The 500 images each having the human facing front pictured therein $(I_F)$=100 images $(I_F^{(1)})$+100 images $(I_F^{(2)})$+100 images $(I_F^{(3)})$+100 images $(I_F^{(4)})$+100 images $(I_F^{(5)})$ The 500 images each having the human facing right pictured therein $(I_R)$=100 images $(I_R^{(1)})$+100 images $(I_R^{(2)})$+100 images $(I_R^{(3)})$+100 images $(I_R^{(4)})$+100 images $(I_R^{(5)})$ Next, as shown in FIG. 6, each of the 500 images was divided into 400 training images and 100 test images in 5 ways shown as a case 1 to a case 5.

Thereafter, a classifier (a body-direction detection means) to judge whether the human in the image was facing right or front was obtained as follows:

(1) Regarding the case 1. AdaBoost was respectively applied to 300 images of $I_L^{(2)}+I_L^{(3)}+I_L^{(4)}$ among the training images $I_L^{(2)}+I_L^{(3)}+I_L^{(4)}+I_L^{(5)}$ and 300 images of $I_F^{(2)}+I_F^{(3)}+I_F^{(4)}$ among the training images $I_F^{(2)}+I_F^{(3)}+I_F^{(4)}+I_F^{(5)}$ to obtain weak classifiers (a plurality of HOG features selected to detect the human facing right and a plurality of HOG features selected to detect the human facing front). Thereafter, a strong classifier (a combination of a plurality of the weak classifiers selected to detect the human facing right and a combination of a plurality of the weak classifiers selected to detect the human facing front) was obtained, each 100 images of $I_L^{(5)}$ and $I_F^{(5)}$, totaling 200 images among the training images, were mapped in a feature space by using the strong classifier, and a classifying plane (a sorting plane) which discriminated a distribution of the mapped images most efficiently was obtained by SVM training. Thereby, the body-direction detection means to judge whether the human was facing right or front was obtained.

(2) By using the classifying plane (the body-direction detection means to judge whether the human was facing right or front) obtained by SVM training, a classification rate (a recognition rate, i.e., a rate of images correctly classified) was obtained using the test images $I_L^{(1)}+I_F^{(1)}$ (200 images).

(3) Regarding the cases 2 to 5, (1) and (2) were performed to obtain a classification rate, respectively.

(4) An average classification rate was obtained from the classification rates of the cases 1 to 5, and the average classification rate was set as an efficiency of the body-direction detection means.

Likewise, a classifier (a body-direction detection means) to judge whether the human was facing front or left and a classifier (a body-direction detection means) to judge whether the human was facing right or left were obtained by (1) to (4) above.

Further, a classifier (a body-direction detection means) to judge whether the human was facing right or another direction (i.e., front or left) was obtained as follows:

(5) Regarding the case 1, AdaBoost was respectively applied to 300 images of $I_L^{(2)}+I_L^{(3)}+I_L^{(4)}$ among the training images $I_L^{(2)}+I_L^{(3)}+I_L^{(4)}+I_L^{(5)}$ and 600 images of $I_F^{(2)}+I_F^{(3)}+I_F^{(4)}+I_R^{(2)}+I_R^{(3)}+I_R^{(4)}$ among the training images $I_F^{(2)}+I_F^{(3)}+I_F^{(4)}+I_F^{(5)}+I_R^{(2)}+I_R^{(3)}+I_R^{(4)}+I_R^{(5)}$ to obtain weak classifiers (the plurality of the HOG features selected to detect the human facing right and a plurality of HOG features respectively selected to detect the human facing front and the human facing left). Thereafter, a strong classifier (a combination of a plurality of the weak classifiers selected to detect the human facing right and a combination of a plurality of the weak classifiers respectively selected to detect the human facing front and the human facing left) was obtained, 300 images of $I_L^{(5)}+I_F^{(5)}+I_R^{(5)}$ among the training images were mapped in the feature space by using the strong classifier, and a classifying plane (a sorting plane) which discriminated a distribution of the mapped images most efficiently was obtained by SVM training.

(6) By using the classifying plane (the body-direction detection means to judge whether the human was facing right or another direction) obtained by SVM training, a classification rate (a recognition rate, i.e., a rate of images correctly classified) was obtained using test images $I_L^{(1)}+I_F^{(1)}+I_R^{(1)}$ (300 images).

(7) Regarding the cases 2 to 5, (5) and (6) were performed to obtain a classification rate, respectively.

(8) An average classification rate was obtained from the classification rates of the cases 1 to 5, and the average classification rate was set as an efficiency of the body-direction detection means.

Likewise, a classifier (a body-direction detection means) to judge whether the human was facing front or another direction and a classifier (a body-direction detection means) to judge whether the human was facing left or another direction were obtained by (5) to (7) above.

As an overall performance as the body-direction detection means, the number of the images correctly classified among the test images for each of the cases 1 to 5 was obtained, thus the classification rate (the recognition rate) was defined as follows:

The classification rate (the recognition rate)=the number of the images correctly classified/the number of all of the test images The classification rate (the recognition rate) scored 90.1% as the overall performance, where the direction of the human as a whole was judged by detecting the entire body, the upper body, the lower body of the human in the test images based on the HOG features (A) having the bin numbers of 3, 5, 7, and 9, and then by detecting each of the directions of the entire body, the upper body, and the lower body of the detected human.

Comparative Example 1

Similarly to Experimental Example, training images and test mages of the cases 1 to 5 were prepared, HOG features of the training images according to Non-patent Literature 1 (i.e., original HOG features by Dalal and Triggs) were computed, AdaBoost was applied to obtain weak classifiers, a strong classifier was then obtained, and SVM training was performed. Thereby, a body-direction detection means to judge whether the human was facing right or front, whether facing front or left, whether facing left or right, whether facing right or another direction, whether facing left or another direction, and whether facing front or another direction was respectively obtained. Thereafter, the original HOG features of the test images were computed, and each of the classification rates (the recognition rates) when judging the direction of the human by using the body-direction detection means was obtained. Here, the original HOG feature was computed by setting the cells all over the image, but a bin number of a density histogram of each of the cells was constant.

An average classification rate of the classification rates obtained by the body-direction detection means was 66.5%.

Comparative Example 2

Similarly to Experimental Example, training images and test images of the cases 1 to 5 were prepared, HOG features of the training images were computed by using human masks, AdaBoost was applied to obtain weak classifiers, a strong classifier was then obtained, and SVM training was performed. Thereby, a body-direction detection means to judge whether the human is facing right or front, whether facing front or left, whether facing left or right, whether facing right or another direction, whether facing left or another direction, and whether facing front or another direction is respectively obtained. Thereafter, the HOG features of the test images were computed by using the human tasks, and each of the classification rates (the recognition rates) when judging the direction of the human by using the body-direction detection means was obtained. Here, the HOG feature using the human mask was computed by defining a shape of the human as a mask and setting the cells on the image within the mask, but a bin number of a density histogram of each of the cells was constant (Nakashima, Tan, Ishikawa, Morie, "On Detecting a Human and Its Body Direction from a Video", The Journal of the Institute of Image Electronics Engineers of Japan, Vol. 39, pp. 1104-1111, 2010).

An average classification rate the classification rates obtained by the body-direction detection means was 85.9%.

As described above, according to the present invention, each of the directions of the entire body, the upper body, and the lower body of the human is detected, and based on detection results of the directions, the body direction is judged. Therefore, compared with Comparative Examples 1, 2 (conventional methods) in which the body direction of the human as a whole is detected, the classification rate (the recognition rate) of the body direction can be improved.

Although the present invention is described above by referring to the embodiment, the present invention is not limited to the configurations of the above-described embodiment, and other embodiments and modifications may be made without departing from the scope of claims of the present invention.

For example, a size of the cell is not limited to 5×5 pixels, and another size may be adopted.

Also, different object detectors may be used for the preliminary phase and for the judgment phase, thus the classifier made in the object detector for the preliminary phase can be stored in the hard disks of a plurality of the object detectors for the judgment phase to detect the target object.

With HOG in Non-patent Literature 1, an edge orientation is examined at every location in a plurality of important locations in an image, but with CO-HOG (Co-occurrence-HOG), 2 edge orientations are examined simultaneously in the plurality of the important locations in the image, thus recognition accuracy is improved. However, a bin number of a histogram is fixed (specified) in the same way as the original HOG. Therefore, by using an improved CO-HOG method made by applying the HOG of the present invention to a conventional CO-HOG method (a plurality of HOG features having different bin numbers at each of a plurality of important locations in the image are computed), the recognition accuracy can further be improved.

INDUSTRIAL APPLICABILITY

An object detection method, in which a plurality of HOG features having different bin numbers for each position of a local area of an image are computed to construct a reference to detect the object, and an object detector using the method are provided. By mounting the object detection method and the object detector according to the present invention in a vehicle, whether an obstacle or a human exists in front can be instantly judged, and an alarm or a signal to stop the vehicle can be given if necessary.

REFERENCE SIGNS LIST

10: object detector, 11: camera, 11a: interface, 12: computer, 13: display, 13a: interface, 14: CPU, 15: hard disk, 15a: interface, 16: memory, 17: calculator, 18: classifier, 19: cell, 20: sample image

The invention claimed is:

1. An object detection method employing an Histograms of Oriented Gradients (HOG) feature (A) representing an intensity gradient of a target image for detecting existence of a target object in the target image based on an HOG feature (B) representing an intensity gradient computed in advance on a sample image capturing the target object, the object detection method comprising the steps of:
    computing a plurality of the HOG features (B) having different bin numbers for each of a plurality of local areas in the sample image to obtain a feature pattern representing the existence of the target object;
    constructing a classifier to judge the existence of the target object in the target image based on the feature pattern; and
    judging the existence of the target object in the target image by the classifier based on a plurality of the HOG features (A) having different bin numbers computed for each of a plurality of local areas in the target image.

2. The method according to claim 1, wherein
    the target object is a human, and
    the classifier detects an entire body, an upper body, and a lower body of the target object in the target image based on the plurality of the HOG features (A) having the different bin numbers, detects each of directions of the entire body, the upper body, and the lower body of the detected target object, and judges a direction of the target object as a whole.

3. The method according to claim 2, wherein, from a plurality of bins of each of the HOG features (B), the bin effective to obtain the feature pattern is selected by a learning algorithm.

4. The method according to claim 3, wherein the learning algorithm is AdaBoost.

5. The method according to claim 1, wherein, from a plurality of bins of each of the HOG features (B), the bin effective to obtain the feature pattern is selected by a learning algorithm.

6. The method according to claim 5, wherein the learning algorithm is AdaBoost.

7. An object detector employing an Histograms of Oriented Gradients (HOG) feature (A) representing an intensity gradient of a target image for detecting existence of a target object in the target image based on an HOG feature (B) representing an intensity gradient computed in advance on a sample image capturing the target object, the object detector comprising:

a calculator computing a plurality of the HOG features (B) having different bin numbers for each of a plurality of local areas in the sample image to obtain a feature pattern representing the existence of the target object, and further computing a plurality of the HOG features (A) having different bin numbers for each of a plurality of local areas in the target image; and a classifier constructed by the calculator based on the feature pattern, and judging the existence of the target object in the target image based on the plurality of the HOG features (A) having the different bin numbers computed by the calculator.

8. The object detector according to claim 7, wherein the target object is a human, and the classifier detects an entire body, an upper body, and a lower body of the target object in the target image based on the plurality of the HOG features (A) having the different bin numbers, detects each of directions of the entire body, the upper body, and the lower body of the detected target object, and judges a direction of the target object as a whole.

9. The object detector according to claim 8, wherein, from a plurality of bins of each of the HOG features (B), the calculator selects the bin effective to obtain the feature pattern by a learning algorithm.

10. The object detector according to claim 9, wherein the learning algorithm is AdaBoost.

11. The object detector according to claim 7, wherein, from a plurality of bins of each of the HOG features (B), the calculator selects the bin effective to obtain the feature pattern by a learning algorithm.

12. The object detector according to claim 11, wherein the learning algorithm is AdaBoost.

\* \* \* \* \*